No. 742,796. PATENTED OCT. 27, 1903.
W. H. MILLER.
MECHANICAL CAR REFRIGERATION SYSTEM.
APPLICATION FILED MAR. 12, 1903.
NO MODEL. 6 SHEETS—SHEET 3.
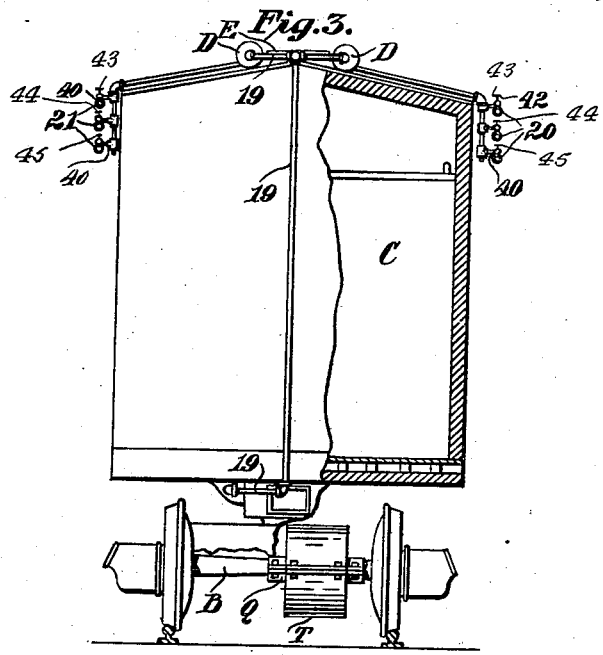
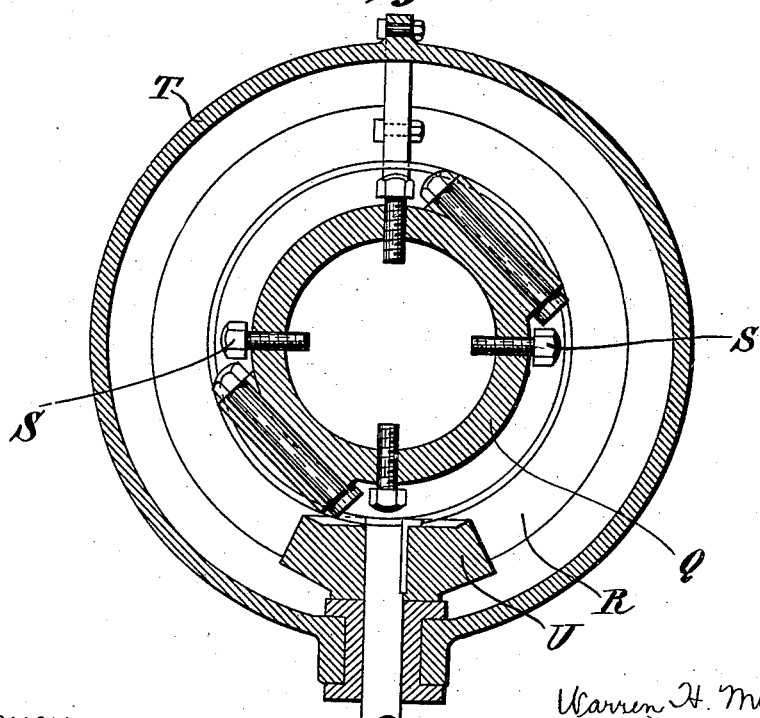

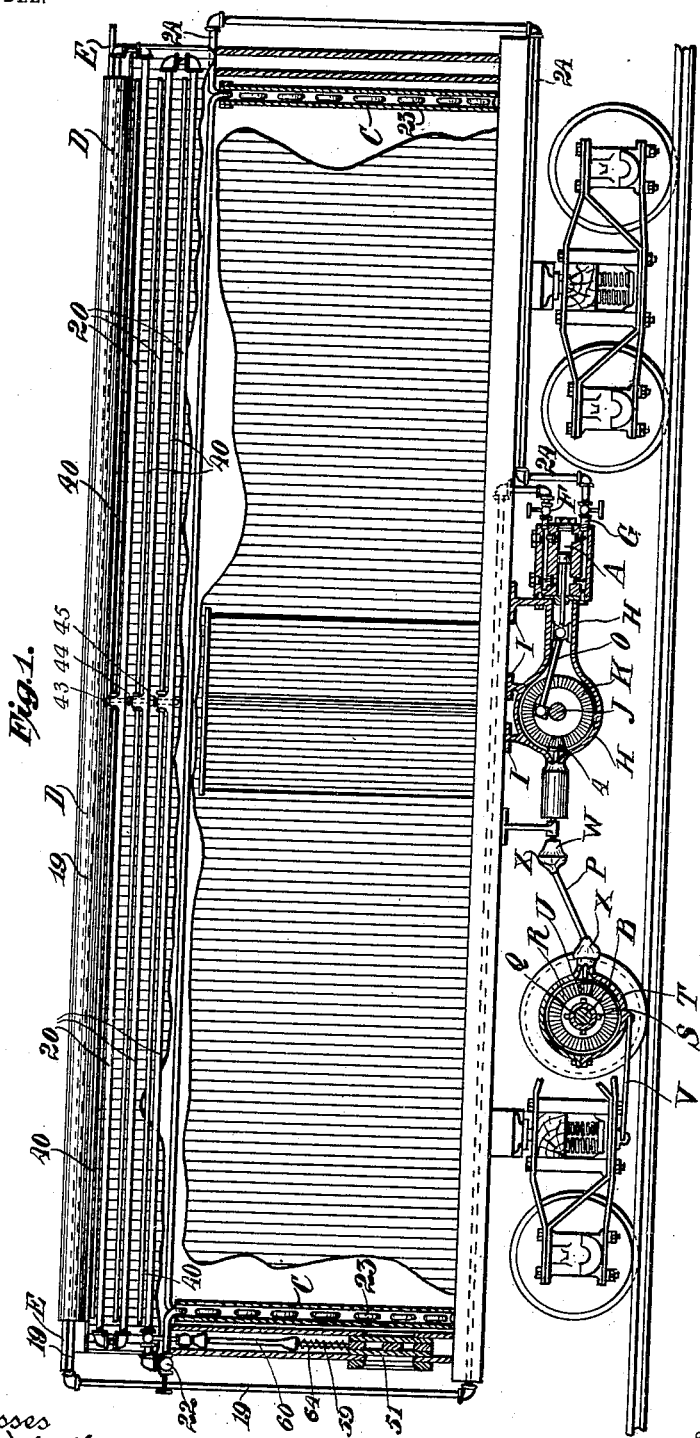

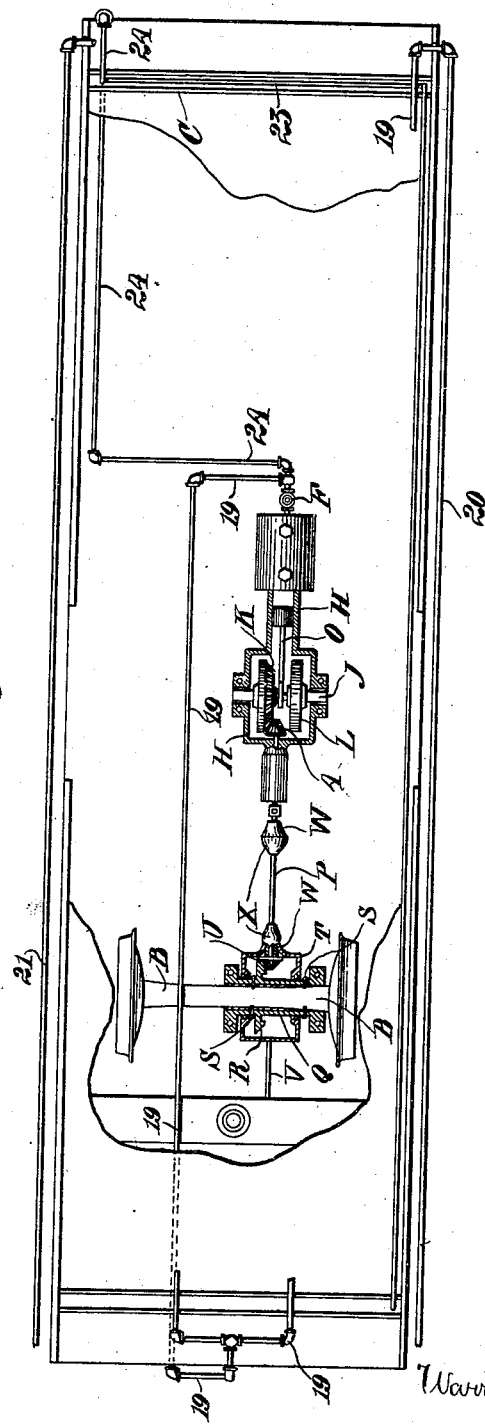

No. 742,796. PATENTED OCT. 27, 1903.
W. H. MILLER.
MECHANICAL CAR REFRIGERATION SYSTEM.
APPLICATION FILED MAR. 12, 1903.
NO MODEL. 6 SHEETS—SHEET 4.
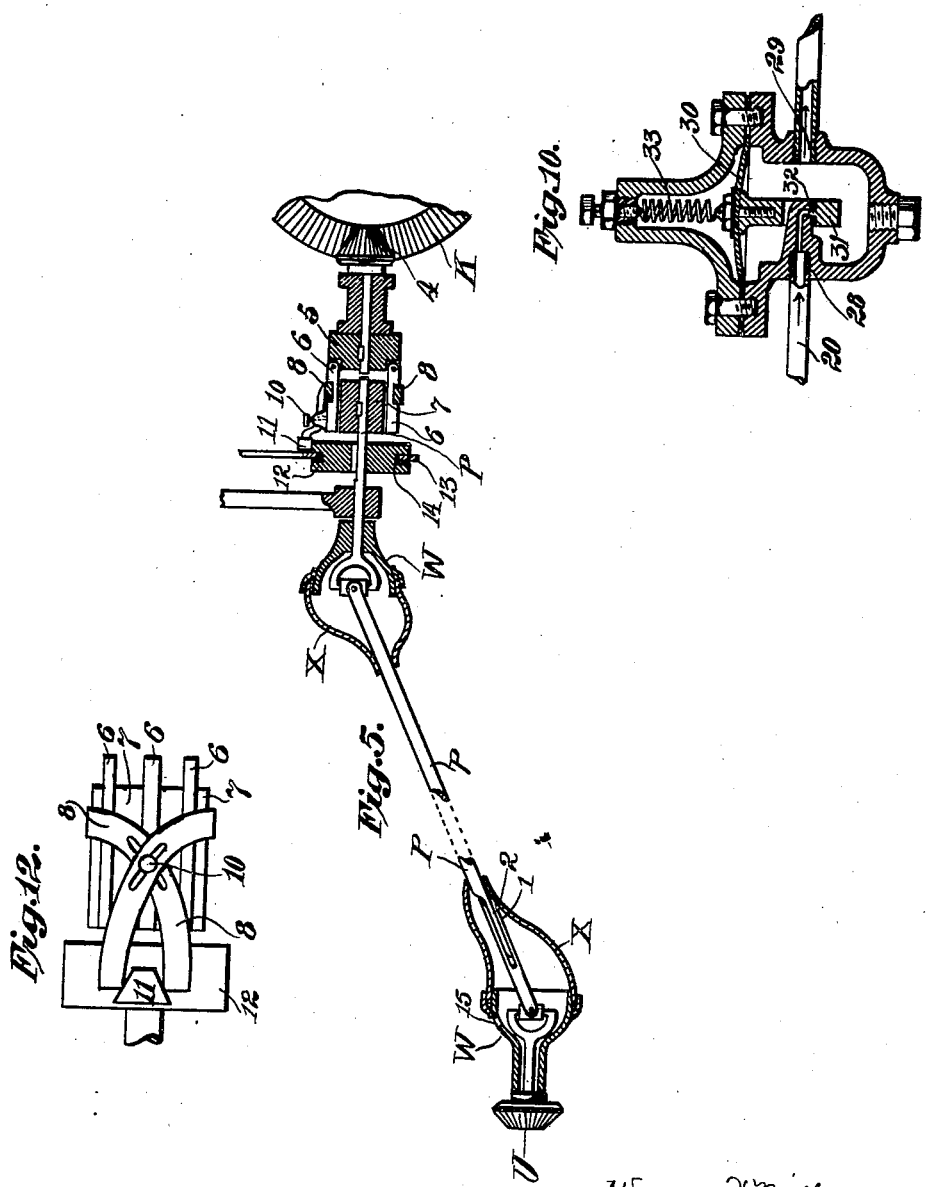

No. 742,796. PATENTED OCT. 27, 1903.
W. H. MILLER.
MECHANICAL CAR REFRIGERATION SYSTEM.
APPLICATION FILED MAR. 12, 1903.
NO MODEL. 6 SHEETS—SHEET 5.
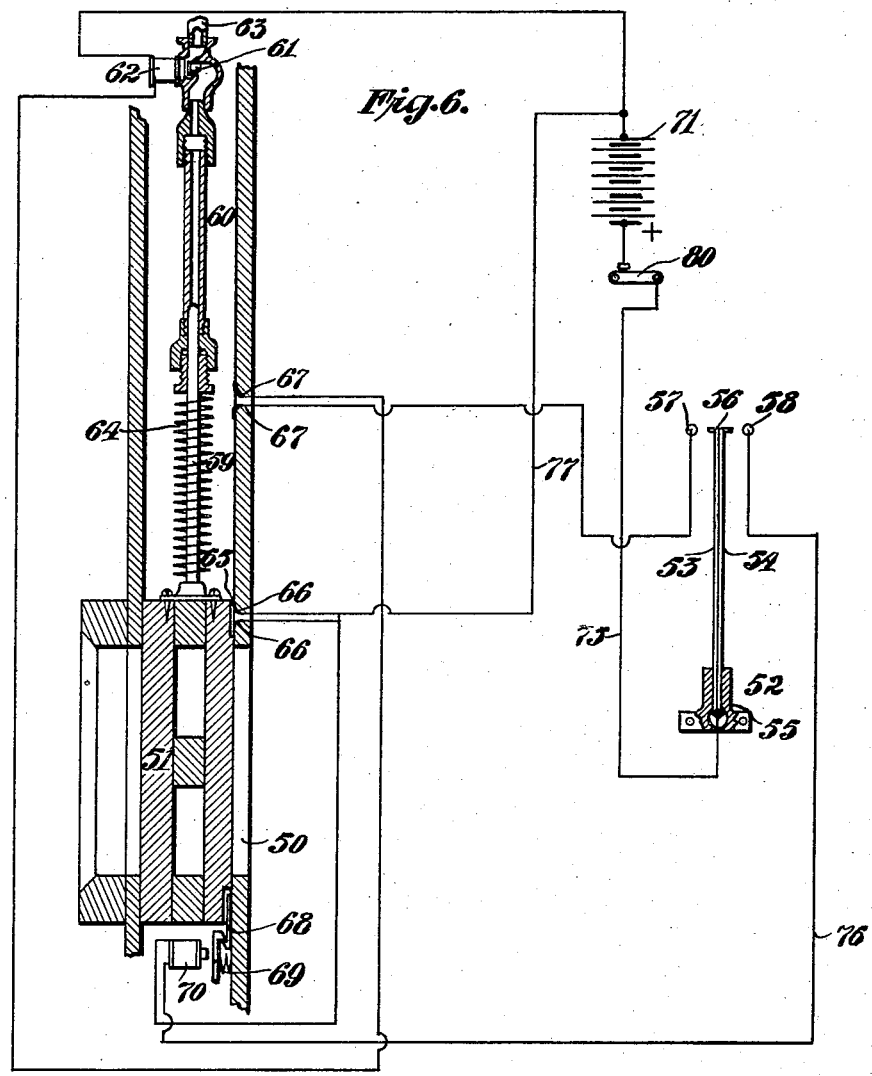

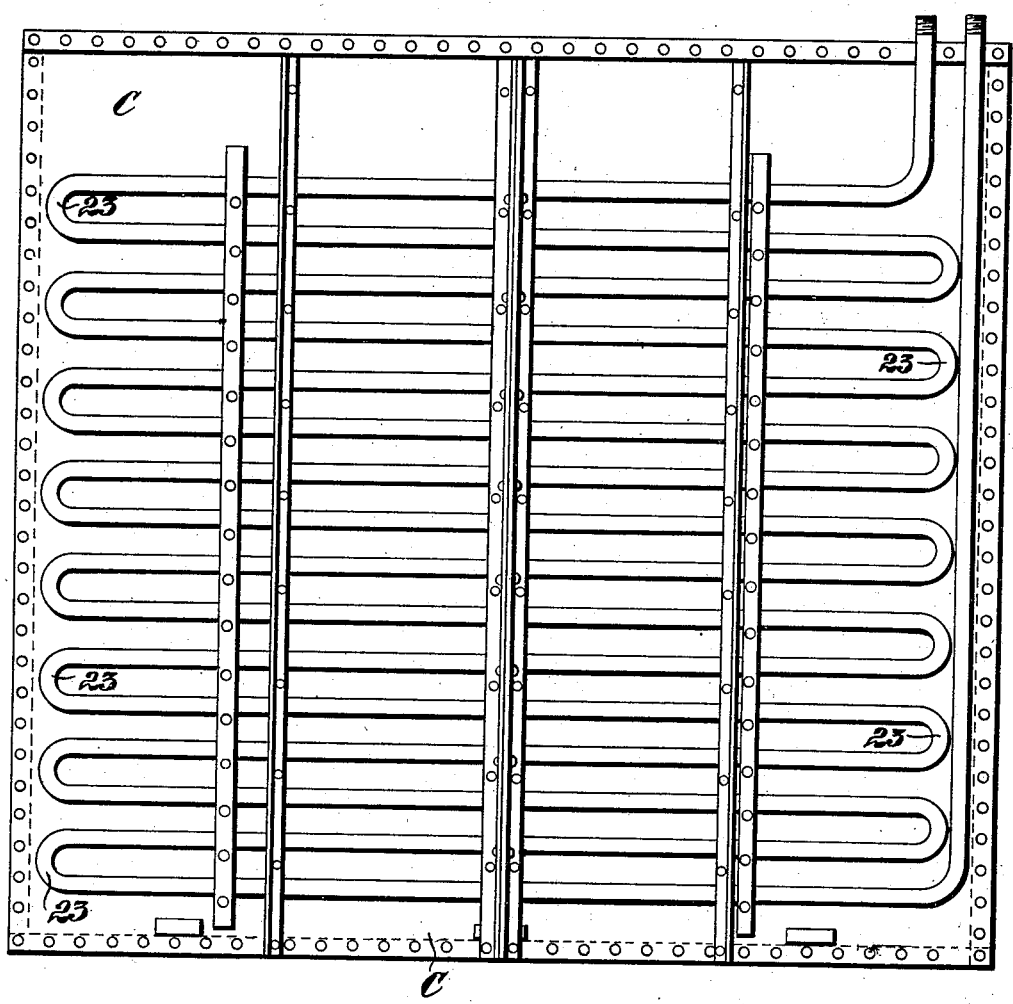

No. 742,796.

Patented October 27, 1903.

UNITED STATES PATENT OFFICE.

WARREN H. MILLER, OF PHILADELPHIA, PENNSYLVANIA.

MECHANICAL CAR-REFRIGERATION SYSTEM.

SPECIFICATION forming part of Letters Patent No. 742,796, dated October 27, 1903.

Application filed March 12, 1903. Serial No. 147,466. (No model.)

*To all whom it may concern:*

Be it known that I, WARREN H. MILLER, of the city of Philadelphia, State of Pennsylvania, have invented certain new and useful Improvements in Mechanical Car-Refrigeration Systems, of which the following is a specification accompanied by drawings.

This invention relates to mechanical car-refrigeration systems; and the objects of the invention are to enable a refrigeration system to be applied to a car in as compact and simple a form as possible, with increased strength of parts which are not liable to get out of order, while at the same time affording provision for ready and efficient regulation.

Further objects of this invention will hereinafter appear; and to these ends the invention consists of apparatus for carrying out the above objects embodying the features of construction, combinations of elements, and arrangement of parts having the general mode of operation substantially as hereinafter fully set forth, and shown in the accompanying drawings, in which—

Figure 1 is a side elevation of a car, partly in section, provided with apparatus embodying the invention. Fig. 2 is a plan view of the car, partly in section, with the bottom removed. Fig. 3 is an end view of the car, partly in section. Fig. 4 is an enlarged transverse sectional view through the axle. Fig. 5 is an enlarged longitudinal sectional view through the driving-shaft and gearing. Fig. 6 is an enlarged detail sectional view of part of the regulating apparatus for the brine-tanks. Fig. 7 is an enlarged detail sectional view through one of the water-supply pipes. Fig. 8 is an enlarged detail sectional view of a modification taken through one of the water-supply pipes. Fig. 9 is a detail sectional view taken through one of the slip-joints on the driving-shaft. Fig. 10 is an enlarged vertical sectional view through the reducing-valve. Fig. 11 is a detail side view of the refrigerating-coils. Fig. 12 is a detail of top view of the clutch.

While any suitable medium may be used in the apparatus, I prefer to use carbonic-acid gas or carbon dioxid as the refrigerating medium for many reasons, the principal of which are because of its safety to perishable goods, its high efficiency, and the small dimensions necessary for the refrigerating mechanism.

One of the features of the invention is the location of the compressor A and its operative connections entirely beneath the frame and flooring of the car. The compressor A is connected to be driven from the axle B by improved means, hereinafter to be described, while the refrigerating-tanks (shown as brine-tanks C) are in this instance located in the ends of the car. Water-tanks D, extending longitudinally of the car, are arranged, as shown, for convenience on the roof for supplying water for evaporating purposes. Suitable piping, hereinafter to be described, connects the compressor and the refrigerating-coils in the tanks C, while suitable water-supply piping is used in connection with the water-tanks D. The compressor A in this instance is shown as a double-acting pump having connected thereto the discharge-pipe F and suction-pipe G. The casing H of the compressor A in this instance is formed of a single casting provided with the brackets I, adapted to be secured to the bottom of the car, while all the moving parts of the car are entirely inclosed within the casing H, and thus protected from dust. The lower part of the casing H may be filled with oil to afford efficient lubrication for the moving parts of the compressor. The casing also affords bearings for the main journal of the compressor. As shown, a fly-wheel shaft J is journaled in the casing H, provided in this instance with fly-wheels K and L, between which upon a shaft is arranged the crank O for the compressor.

Operative connections are provided between the axle B and the shaft J for driving said shaft from the axle, and these connections are of a telescopic character, being provided with slip-joints, so that the connecting-rod or driving-shaft P may be lengthened or shortened, as desired—as, for instance, in going around curves. The connecting-rod P is also provided with universal joints at each end for efficient operation, and a suitable clutch is provided upon said connecting-rod for disengaging the driving connections as desired.

Referring more particularly to the gearing, it will be seen that upon the axle B is arranged the sleeve Q, which is formed in this instance integrally with the beveled gear R. The sleeve Q is formed of two halves, as shown, suitably bolted together, and it is easily mounted on any size axle. Suitable provision is afforded for centering the sleeve upon the axle and for connecting the sleeve to be rotated therewith, as shown set-screws S being provided upon the sleeve for centering the same and for securing the sleeve to the axle. The sleeve rotates within the gear-case T, formed of two parts bolted together, which case is provided with a bearing for the connecting-rod P, upon the end of which rod is secured the beveled pinion U, meshing with the beveled gear R. In order to prevent the gear-case T from turning, the rod V is provided, connecting the case with the spring-plank of the truck or other suitable part thereof.

As shown in detail in Fig. 5, the universal joints on the connecting-rod P are partially inclosed within the bell-shaped metallic casings or guards W, which may be of cast-iron, while the remainder of each joint is covered with a dust-guard X, which may be of rubber and adapted to be firmly secured over the end of the bell-shaped guard W and fitted tightly to the shaft. According to this construction it will be seen that the whole dust-guard or casing turns with the shaft. According to this construction of dust-guard described and shown in connection with the universal joints it will also be seen that the shaft may change its length as desired, while dust is excluded from the universal joint. The shaft is also permitted to have play in any direction. Apertures 15 are provided in the metallic guards W for the insertion of hub-lubricating grease, and these holes may afterward be plugged. In order that the shaft may change its length, slip-joints are provided, each comprising in this instance the socketed member 1, within which the reduced end 2 of the shaft fits. The fitting surfaces of the socketed member and shaft, respectively, as shown in Fig. 9, abut one against the other, so that the shaft may be rotated, but at the same time slide relatively to the member 1.

Within the casing H is shown a beveled pinion 4 on the end of the shaft or connecting-rod P, which pinion meshes with a beveled toothed portion of the fly-wheel K. Either of the fly-wheels K or L may be beveled as desired to form a gear meshing with the pinion 4 on the connecting-rod P.

Any suitable clutch may be provided for disengaging the driving connections from the compressor. In this instance a clutch member 5 is shown (see Figs. 5 and 12) fast to one portion of the shaft and provided with the fingers 6, which may be clamped by suitable means about the clutch member 7, fast to the main portion of the shaft P. Around the fingers 6 is shown a strap 8, the ends 9 of which are crossed, as shown in Fig. 12, and pivoted to the projection 10 upon one of the fingers. Means are provided for forcing a wedge-shaped plug 11 between the crossed ends 9 of the strap in order to tighten the strap and press the fingers 6 into frictional relation with the rotating member 7. In this instance a disk 12 is shown rotatable with the shaft P and slidable thereon, while a loose ring 13 is adapted to a groove 14 in the disk 12. The disk is provided with the wedge-shaped plug 11, and any suitable means may be provided for actuating the ring 13, and thus causing the disk 12 to move the wedge-shaped plug 11 between the ends 9 of the strap 8. I have simply shown a suitable form of clutch mechanism, but am not to be understood as limiting myself to any particular clutch mechanism.

As hereinbefore stated, I prefer to use carbonic-acid gas or carbon dioxid as the refrigerating medium. From the compressor A the carbonic-acid gas after being compressed passes, by means of the pipe 19, first to and through the water-tanks D and thence backwardly and forwardly under the eaves of the car to form the condensers 20. By passing the hot pipes 19 through the water-tanks these tanks will be kept from freezing in cold weather. The gas is cooled in the condensing-pipes 20 by the evaporation of water supplied to the absorbent coverings 21 of these pipes, Figs. 7 and 8. The gas after being liquefied in the condensing-pipes passes to the reducing or expansion valve 22 and thence to the expansion-coils 23 in the tanks C. From the expansion-coils suitable connection is made by means of the pipes 24 back to the suction side of the compressor A.

The valve 22 is a suitable reducing-valve, set so as to permit the liquid to flow in proportion to the speed of the compressor and maintain the evaporation pressure in the expansion-piping substantially constant regardless of changes of speed of the compressor. As the speed of the compressor is dependent on the constantly altering speed of the car, it will be seen that the function of this valve 22 is of great importance. In Fig. 10 a detail sectional view of this valve is shown, in which 28 represents the inlet, and 29 the outlet, of the valve-chamber. A suitable diaphragm 30 extends across the top of the valve-chamber and supports the valve 31, adapted to open and close the orifices 32. The spring 33 is under compression and tends to oppose the action of the diaphragm 30. When the evaporation pressure in the expansion-coils falls to a predetermined limit, the valve 31 will open and permit more of the liquefied gas to pass into the expansion-coils. When the pressure reaches the desired amount again, the valve 31 will automatically close.

In Fig. 12 a detail side elevation of the coils in the tanks C is shown, with the supporting means therefor.

One of the objects of this invention is to improve upon the apparatus for supplying cooling liquid to the condensers. As shown, above each of the condensing-pipes 20 is arranged a longitudinally-extending water-pipe 40, Figs. 1 and 7, while an absorbent covering 21 surrounds each condenser and its adjacent water-supply pipe. The water is permitted to drip from the apertures 41 in the pipes 40, and, as shown, a set-screw 42, forming a needle-valve, is provided for each aperture 41, so that said apertures may be opened or closed to the desired extent by adjusting the screws 42. The screws 42 are tapped into the upper part of the supply drip-pipes and close the holes diametrically opposite the lower part of the pipes. The absorbent coverings 21 are thus kept wet to cool the gas by the evaporation of the water supplied. It has been found impracticable to bore a small enough hole in thick metal to drip water under even a few inches of pressure, and as uniform pressure regardless of the drip is essential to an even drip through all of the holes of the supply-pipe it will be seen that the construction described for regulating at will the drip from each hole enables the supply of water to be nicely regulated for evaporation purposes. The supply-pipes 40 are provided with cocks 43, 44, and 45 for regulating the pressure obtained in each supply-pipe by proportioning the inflow through the cocks and the outflow through the holes. This arrangement of cocks is important, as the rate of evaporation of moisture differs on each condenser-pipe. It will be seen that the upper condenser-pipe is the hottest and requires the most water. The lowest condenser-pipe is a cold pipe full of liquid and requires the least water, only enough to cool the liquid. The intermediate condenser-pipe is cooler than the upper pipe and requires less water than the same.

The absorbent covering 21 may be of any suitable character; but I prefer to use a copper-gauze fabric the interstices of which are filled in with absorbent cement. This covering has a less heat-obstructing capacity than others, or, in other words, affords less obstruction to the passage of heat from the pipe to the evaporating-surface. As shown in Fig. 7, the wire-gauze laps over on the top of the supply-pipe, and a guard-case 46 may be secured down upon the covering 21 by means of the feed-screws 47 upon the set-screws 42. The edges of the guard 46 bear lengthwise on the pipe and distribute the water lengthwise.

A modified construction is shown in Fig. 8. The covering 21 extends along the pipes 20 and 40 between each of the set-screws 42 and does not extend over said set-screws and is secured above the supply-pipes 40 by suitable binder 48. If the covering 21 extended over the set-screws 42, said screws could not be manipulated for adjustment, so that the covering, therefore, extends only between the screws.

In order to afford provision for a reserve of cold in case the car should be stopped before unloading, I immerse the expansion-coils 23, as described, in the tanks C, located, preferably, at each end of the car, or if the car is to be used for other than perishable goods the tanks C may be placed longitudinally in the center of the car for better distribution of the refrigeration. These tanks C are filled with brine whose freezing-point is such that the radiation from the tank into the car at that point is sufficient to maintain the car at the temperature desired. The capacity of the compressor in this instance is made at least one and one-half times the total ice-melting capacity of the car, so that considerable surplus refrigeration is available for storage. As the brine temperature cannot fall below its fixed freezing-point and as the temperature of the expansion-pipes is maintained about 10° below this point by the expansion-valve 22, it will be seen that the surplus refrigeration is taken up in freezing the brine, and the cold thus stored or latent in the frozen brine is available during the time that the car is stopped. The dimensions of the tanks are preferably such that space is left around each expansion-pipe for uniform freezing of the brine without bulging the walls of the tanks.

In the front end of the car an aperture 50 is provided, and a door 51 is adapted to be raised and lowered (in this instance automatically) to open and close the aperture 50 for the purposes hereinafter to appear. The door 51 is adapted to be automatically shut when the temperature within the car is low and automatically opened at a predetermined low temperature to raise said temperature by the entrance of warm atmospheric air. Any suitable means may be provided for automatically operating the door 51 at predetermined temperatures, in this instance I having shown a thermostat 52, comprising the rod 53, of bismuth, and the brass rod 54, suitably supported in the socket 55 and connected together. The end of the composite rod is provided with a contact 56, adapted to coöperate with the contacts 57 and 58 at each side thereof. At a low temperature the composite rod will bend to one side and close an electrical circuit between the contacts 56 and 58, while at a higher temperature said composite rod will bend to the other side and closes a circuit between the contacts 56 and 57. The door 51 is carried upon the composite rod 59, operating within the cylinder 60, at the upper end of which is arranged the electromagnetically-operated valve 61, controlled, as shown, by the electromagnet 62. The pipe 63 connects with the condensing-coils to force the piston-rod 59 downward when the valve 61 is opened. A suitable spring 64 tends to raise the door 51 after it has been lowered. A contact 65 is provided upon the door, adapted to coöperate with contacts 66 and 67, to which electrical circuits are led. The door 51 is also provided with a catch 68, with which a latch 69 is adapted to coöperate, said latch 69 being controlled by the electromagnet 70. When the magnet 70 is energized, the latch 69 is withdrawn, and the door 51 is permitted to rise under the action of the spring 64. Any suitable battery 71 is included in circuit, and, assuming that the door is in the position shown in Fig. 6 and the latch 69 in engagement with the catch 68, let the temperature fall to about 32°, for instance. Then the contacts 56 and 58 will be closed and a circuit will be completed, as follows: from the positive pole of the battery, by wire 75 to and through the composite arm and contacts 56 and 58, by wire 76 through magnet 70, contacts 65 and 66, and back by wire 77 to the negative pole of the battery. This will release the catch 69. As the door rises contact 65 moves into coöperation with contact 67, so that when the temperature rises to about 34°, for instance, contacts 56 and 57 will be closed and a circuit will be completed through the magnet 62, which operates its valve 61 and permits pressure to operate the piston 59 and also the door 51. A suitable switch 80 is provided in the circuits to permit the automatic apparatus to be cut out when desired.

Obviously some features of my invention may be used without others, and my invention may be embodied in widely-varying forms. Therefore without limiting myself to the construction shown and described or enumerating equivalents I claim, and desire to obtain by Letters Patent, the following:

1. The combination with a car and its wheels and axles, of a suitable compressor, and operative connections for driving said compressor from one of the axles, the compressor and driving connections therefor being arranged entirely beneath the floor of the car, and a conducting-pipe from the compressor to the interior of the car, substantially as set forth.

2. The combination with a car and its wheels and axles, of a compressor, an inclosing casing therefor affording bearings for the rotary parts of the mechanism, said casing being situated beneath the floor of the car, and means external to the casing connected to operate said mechanism from one of the axles, substantially as set forth.

3. The combination with a car, of compressor, and inclosing casing therefor mounted outside the car, and a universally-jointed shaft, provided with means for changing its length and connected to operate said refrigerating mechanism from the car-axle.

4. The combination with a car, of a compressor, and inclosing casing therefor mounted outside the car, and a universally-jointed shaft provided with means for changing its length and connected to operate said refrigerating mechanism from the car-axle, and a clutch mechanism operatively connected to said shaft between the axle and refrigerating mechanism for connecting and disconnecting the driving connections from said mechanism.

5. The combination with a car, of compressor thereon, a sleeve connected to rotate with the axle and provided with a gear, a loose casing on the said sleeve, suitably held from rotation, and a shaft connected to drive the refrigerating mechanism and provided with a bearing in said loose casing.

6. The combination with a car, of compressor thereon, a sleeve upon the axle and means for centering said sleeve, a gear on said sleeve, a loose casing upon the sleeve surrounding said gear, a shaft connected to transmit power from the gear to the refrigerating mechanism, a bearing being afforded in the loose casing for the journal of the shaft, and means for preventing rotation of the casing.

7. The combination with a car and a compressor, of a bevel-gear having a hub forming a sleeve on the axle, means for centering the sleeve upon the axle, a shaft connected to operate the refrigerating mechanism and provided with a bevel-pinion meshing with the bevel-gear on said sleeve, a casing around the sleeve, in which casing the sleeve rotates, said casing affording a bearing for the journal of the shaft and a link connecting the truck of the car with the casing.

8. The combination with a car, of compressor driven from the axle, a rotary shaft provided with a universal joint, a bell-shaped guard or casing for said joint, said guard being provided with an open end, and a guard of elastic and flexible material surrounding the shaft and fitted over the open end of said bell-shaped casing.

In testimony whereof I have signed my name to this specification in the presence of two subscribing witnesses.

WARREN H. MILLER.

Witnesses:
PHILIPPUS W. MILLER,
ROBERT G. ERSKINE.